US012002457B1

(12) United States Patent
Heitzman et al.

(10) Patent No.: US 12,002,457 B1
(45) Date of Patent: Jun. 4, 2024

(54) ACTION ELIGIBILITY FOR NATURAL LANGUAGE PROCESSING SYSTEMS

(71) Applicant: Amazon Technologies, Inc., Seattle, WA (US)

(72) Inventors: Eli Heitzman, Seattle, WA (US); Shekar Reddy, New York, NY (US); Christopher Anthony James, Seattle, WA (US); Jyoti Chhabra, Seattle, WA (US); Sylvester-Jaron Dewey Ogletree, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 16/834,853

(22) Filed: Mar. 30, 2020

(51) Int. Cl.
   *G06Q 30/0601* (2023.01)
   *G10L 15/18* (2013.01)
   *G10L 15/22* (2006.01)
   *G10L 15/30* (2013.01)
   *H04N 21/45* (2011.01)
   *H04N 21/4784* (2011.01)

(52) U.S. Cl.
   CPC .............. *G10L 15/22* (2013.01); *G10L 15/18* (2013.01); *G10L 2015/223* (2013.01)

(58) Field of Classification Search
   USPC .................. 725/9–36; 726/1–7; 704/1–274
   See application file for complete search history.

(56) References Cited

U.S. PATENT DOCUMENTS

| | | | |
|---|---|---|---|
| 2010/0077017 A1* | 3/2010 | Martinez | H04W 4/02 709/201 |
| 2013/0339146 A1* | 12/2013 | Goldberg | G06Q 30/02 705/14.53 |
| 2015/0121408 A1* | 4/2015 | Jacoby | H04N 21/251 725/18 |
| 2015/0371239 A1* | 12/2015 | Hoyne | G06Q 30/0201 705/7.29 |
| 2016/0073143 A1* | 3/2016 | Filev | H04N 21/44218 725/10 |
| 2019/0235831 A1* | 8/2019 | Bao | G10L 15/19 |
| 2019/0306137 A1* | 10/2019 | Isaacson | G06Q 30/0625 |
| 2021/0090575 A1* | 3/2021 | Mahmood | G10L 17/10 |
| 2022/0337997 A1* | 10/2022 | Spencer | H04L 43/10 |

OTHER PUBLICATIONS

Rathod Yogesh Chunilal, Ephemeral Content Sharing and Connecting Users Based on Sharing Unique Link From 3R Parties' Applications and Storing and Relating Unique Identity or Code of Link Sharing User With Link Accessing User, Jan. 31, 2019 (Year: 2019).*

* cited by examiner

Primary Examiner — Marcellus J Augustin
(74) Attorney, Agent, or Firm — Pierce Atwood LLP

(57) ABSTRACT

A system is provided for determining which user inputs correspond to eligible actions for a particular device type. The system determines a device type identifier corresponding to the device that receives the user input and an action to be performed in response to the user input. The system determines that the performed action corresponds to an eligible action type for the device type identifier, and performs further processing using data related to the corresponding user input. Different device type identifiers may be associated with different eligible action types. The system may evaluate multiple user inputs from different users and different devices.

20 Claims, 9 Drawing Sheets

| Profile Identifier | Device Identifier | Device Type Identifier | Action Description | Action Identifier |
|---|---|---|---|---|
| 1fdfd2 | ab503 | ABC | Start free trial | 123tye |
| 1fdfd2 | 564ddd | XYZ | Add item to cart | 456que |
| 8dfewr35d | ab503 | ABC | Start free trial | 123tye |
| dfdsa835 | afdf90 | LMN | Purchase item | 879opt |
| fadsfd5dd | xyw948 | KJC | Review Product | 598sum |
| 8dfewr35d | 835uit | RTY | Reorder item | 472kjc |

User Input Storage 275

ACTION ELIGIBILITY FOR NATURAL LANGUAGE PROCESSING SYSTEMS

BACKGROUND

Spoken language understanding systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as spoken language understanding. Spoken language understanding may also involve converting a user's speech into text data which may then be provided to various text-based software applications.

Spoken language understanding may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
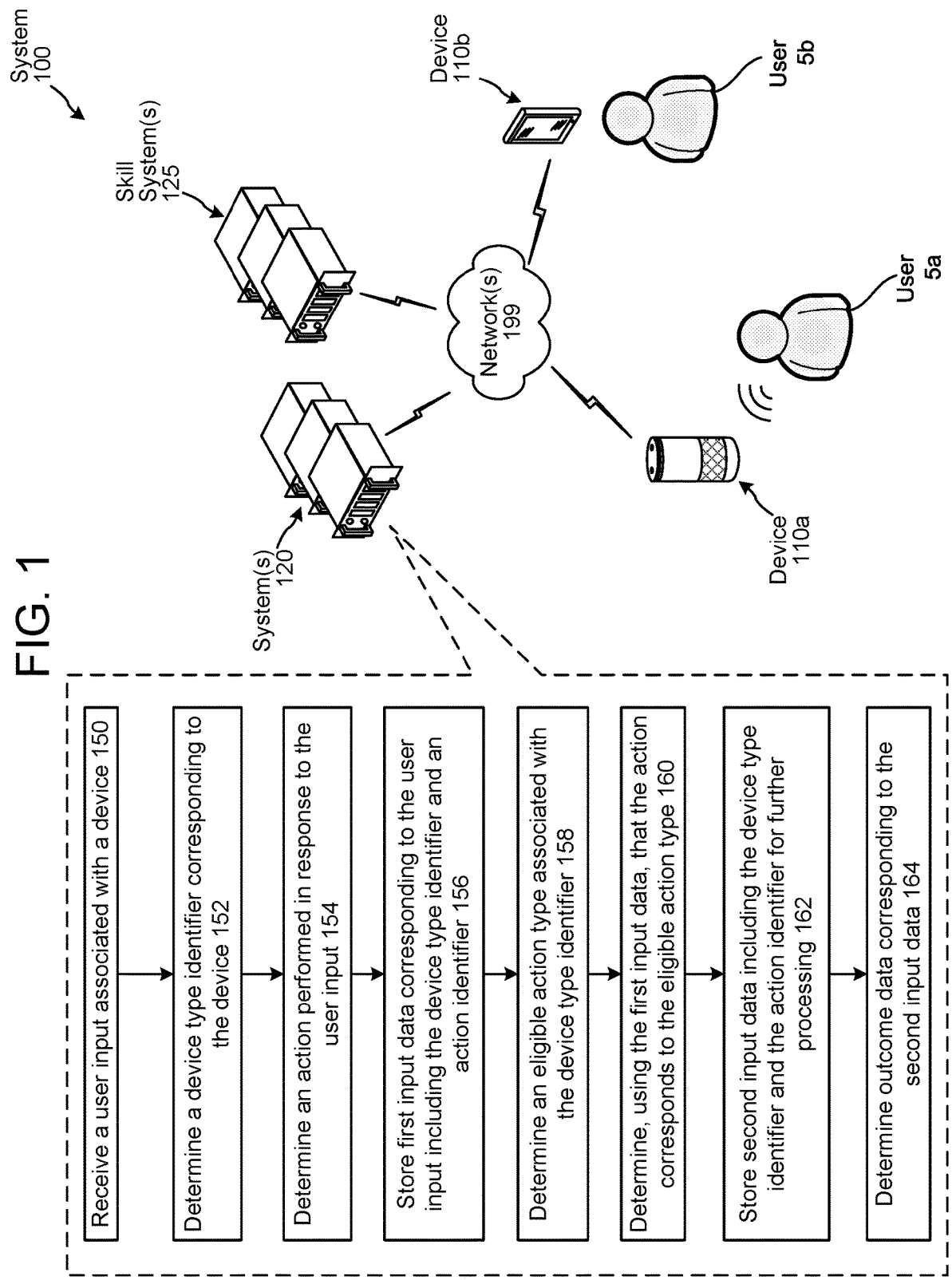
FIG. 1 is a conceptual diagram illustrating a system for determining user inputs corresponding to eligible action for further processing according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech.

A system may perform actions in response to user inputs which may be in the form of natural language inputs (e.g., spoken inputs and/or typed inputs). For example, for the natural language input "play Adele music," the system may output music sung by an artist named Adele. For further example, for the natural language input "add milk to my shopping cart," a shopping skill system may be invoked to add milk to a virtual shopping cart associated with a user's profile. In another example, the system may register the user for a music application in response to an input indicating the user's intent to start a free trial or a paid subscription of a music application. In the foregoing examples, actions correspond to the outputting of music, adding an item to a shopping cart, and registering for a music application. As such, as used herein, an "action" may refer to some result of a skill system's and/or spoken language understanding (SLU) system processing.

A SLU system may communicate with various other systems and devices to perform actions in response to a user input. The other systems and devices may be manufactured, developed and/or maintained by various entities. The other systems and devices may need to be configured in a certain way to provide particular functionalities via the SLU system.

To inform and encourage configuration of the various systems and devices to provide particular functionalities, the system of the present disclosure may determine when a user interacts with the SLU system via a particular device or other type of system to perform particular actions (referred to herein as eligible actions). The system of the present disclosure may determine which user interactions involve eligible actions that were performed using a particular device/system (identified, herein, using a device type identifier). For example, a user may say "add milk to my Whole Foods shopping cart," while in their car that includes a device enabled to perform SLU processing. The eligible action in this case may be "adding an item to a Whole Foods shopping cart" and the device type identifier may correspond to the car manufacturer. In another example, a user may provide an input (e.g., via a touchscreen or a voice input) at a refrigerator related to a question about a product. The eligible action in this case may be "asking a product Q&A" and the device type identifier may correspond to the refrigerator manufacturer.

The system may determine which actions are eligible actions based on a user profile identifier and a device type identifier. Some actions may only be eligible if performed for the first time by a user, device, application, skill, or other object (physical and/or virtual) with its own system identifier. For example, starting a subscription for an application may be an eligible action if performed by a first time subscriber/user. As another example, linking a personal instance of an application on a mobile device to a skill may be an eligible action if that application has never been linked to the skill before. The system may also recognize that two users may share a device and may perform the eligible action using the same device. For example, a first user may start a subscription as a first time subscriber via a device installed in a vehicle, and a second user may start a subscription as a first time subscriber using the same device in the vehicle. Using the user profile identifier, the system may determine that both actions are eligible actions for further processing.

Eligible actions performed via different device types may be processed differently. For example, a user adding an item to a virtual shopping cart via an iPhone may be processed differently than the user adding an item to the virtual shopping cart via an Android phone. Some eligible actions may relate to performing an action using a pair of devices, and eligible actions performed via different pair of devices may be process differently. For example, a user may use a first branded phone (e.g., Google Pixel Phone, Samsung Galaxy phone, etc.) with a smart cart in a grocery store to purchase items in the smart cart. In this case, the pair of devices is a first branded phone (identified by a device type identifier provided by manufacturer) and the smart cart in the grocery store (identified by a device type provided by the grocery store). Another user may use a different branded phone (e.g., Apple iPhone, Motorola phone, etc.) with the smart cart in the grocery store, the pair of devices being an second branded phone and the smart cart, and such an action may be processed differently than the same action being performed using the Samsung and smart cart pairing.

The system of the present disclosure may determine outcome data corresponding to eligible actions performed via devices of particular manufacturers who have registered to receive data regarding eligible actions. In some cases, the eligible actions may be included in reporting metrics provided to the device manufacturer. In some cases eligible actions may result in providing financial incentives to the device manufacturer, such as payments, special credits, discounts, promotions, etc. In some cases, the device manufacturer may be able to provide incentives to the users using information related to the eligible actions. In some cases, the device manufacturer may use the information regarding the eligible actions to provide directed advertising.

A system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating a system for determining user inputs corresponding to eligible action for further processing according to embodiments of the present disclosure. Although the figures and discussion herein illustrate certain operational steps of the system in a particular order, the steps described may be performed in a different order (as well as certain steps removed or added) without departing from the intent of the disclosure. As illustrated in FIG. 1, the system 100 may include device 110a local to a user 5a and device 110b local to a user 5b, both in communication with one or more systems 120 across one or more networks 199. The system 100 may also include one or more skill systems 125 in communication with the system(s) 120 and the devices 110 across the network(s) 199.

The system(s) 120 receives (150) a user input associated with a device. The user input may be audio data that includes an utterance spoken by the user 5a and captured by the device 110a. The system(s) 120 may perform automatic speech recognition (ASR) using the audio data to determine text data representing the utterance. ASR may be performed on the audio data as described in detail below. In some embodiments, the user input may be text data received via the device 110b. In some embodiments, the user input may be other types of inputs, such as, keyboard input, mouse clicks, touchscreen input, selection of displayed information/graphical elements, etc., and the system(s) 120 may determine text data representing the other types of inputs. The system(s) 120 may receive multiple user inputs from multiple different users via multiple different types of devices 110.

The system(s) 120 determines (152) a device type identifier corresponding to the device that received/captured the user input. The system(s) 120 may determine the device type identifier using data provided by the device 110, that may include the device type identifier associated with the device 110. The device type identifier may be a unique identifier assigned or provided to the device 110 by the device manufacturer. Different device type identifiers may be associated with different device types. For example, a tablet manufactured by Samsung may be associated with a first device type identifier, a phone manufactured by Samsung may be associated with a second device type identifier, a tablet manufactured by Amazon may be associated with a third device type identifier, and so on.

The system(s) 120 determines (154) an action performed in response to the user input. The system(s) 120 may determine a natural language representation of the user input using natural language understanding (NLU) as described below in more detail. Using NLU, the system(s) 120 may determine an action responsive to the user input by determining a domain, an intent and entity values associated with the user input. The system(s) 120 may perform the action in response to the user input. For example, the user input may be "add milk to my shopping cart," and the system(s) 120 may perform the action of adding the item "milk" to a virtual shopping cart associated with the user's 5 profile.

The system(s) 120 stores (156) first input data, in a first data storage, corresponding to the user input, where the first input data includes the device type identifier and an action identifier associated with the action performed in response to the user input. The system(s) 120 may determine an action identifier associated with the action determined in step 154, where the action identifier may identify the action in general terms, for example, without including entity values particular to the user input but including a domain or skill corresponding to the action. For example, for the user input "add milk to my Amazon shopping cart" the action identifier may be "adding an item to an Amazon shopping cart." In another example, for the user input "sign me up for a Kindle subscription" the action identifier may be "starting a Kindle subscription." The first data storage (e.g., user input storage 275) may store input data corresponding to multiple different user inputs received from multiple different devices. As such, the first data storage may store first input data (including a first device type identifier and a first action identifier) corresponding to a first user input, second input data (including a second device type identifier and a second action identifier) corresponding to a second user input, third input data (including a third device type identifier and a third action identifier) corresponding to a third user input, and so on.

In some embodiments, the system(s) 120 may also determine a profile identifier associated with the user input, where the profile identifier may correspond to a user profile associated with the user 5 that provided the user input. The system(s) 120 may use various techniques to identify the user as described in detail below. The system(s) 120 may determine the profile identifier using data stored at a profile storage 270. The system(s) 120 may include the profile identifier in the first input data, along with the device type identifier and the action identifier, for storing in the first data storage. As such, the first input data may include a first profile identifier, the second input data may include a second profile identifier, and so on.

In some embodiments, the first input data may also include a representation of the user input (e.g., text data or other types of data), one or more skill system(s) 125 that were invoked to perform the action, a device identifier uniquely identifying the device 110 that received the user input, ASR data corresponding to the user input, NLU data corresponding to the user input, a timestamp indicating when the user input was received, and other data related to the user input.

The system(s) 120 determines (158) an eligible action type associated with the device type identifier. The system(s) 120 may receive data indicating various eligible action types for various device type identifiers. For example, the data may indicate that a first eligible action type (e.g., adding an item to a shopping cart) is associated with a first device type identifier (e.g., a Samsung smartphone), a second eligible action type (e.g., starting a new music subscription) is associated with a second device type identifier (e.g., a device installed in a Ford manufactured car), and so on. The system(s) 120 may determine one or more eligible action types associated with the device type identifier determined in step 152. For example, the device type identifier may be associated with multiple eligible action types.

As such, the system(s) 120 may determine which device types are associated with which eligible action types. In some embodiments, the system(s) 120 may use a rules engine to determine eligible action types associated with device type identifiers. In some embodiments, the system(s) 120 may use data stored in a database or data table. In some embodiments, the system(s) 120 may use a machine learning model to determine which eligible action types are associated with a device type identifier.

The eligible action type may correspond to further processing of a user input received by the system(s) 120, where the further processing is extraneous/unrelated to processing required to respond to the user input. For example, certain processing may be performed to respond to a user input or otherwise to actually cause the requested user command to be executed. The eligible action type corresponds to further processing beyond and separate from that, such as identifying a payment to be made, updating/training a component, generating a report/metrics on eligible actions, or the like. The further processing caused/triggered when a user input corresponds/matches the eligible action type (or eligible action criterion) may be nonessential/not required to respond to the user input (by performing an action, including presenting an output via the device 110, operating another device, storing data responsive to the user input, etc.). The further processing caused/triggered by the eligible action type may be performed after the system(s) 120 have responded to the user input by performing an action.

The system(s) 120 determines (160), using the first input data, that the action corresponds to the eligible action type. The system(s) 120 may compare the action identifier to the eligible action type. For example, the action identifier may be "adding an item to a shopping cart" and the eligible action type may be "adding an item to a shopping cart." In some embodiments, the system(s) 120 may determine that the action performed in response to the user input corresponds to the eligible action type based on the corresponding action identifier matching/being the same as the eligible action type. In some embodiments, the system(s) 120 may determine that the action performed in response to the user input corresponds to the eligible action type based on the corresponding action identifier being similar to the eligible action type. In some embodiments, the system(s) 120 may determine that the action performed in response to the user input corresponds to the eligible action type based on the corresponding action identifier being of the same category as the eligible action type. In some embodiments, the system(s) 120 may use an algorithm(s) and/or a machine learning model(s) to determine if the action corresponds to the eligible action type.

In some embodiments, the eligible action type may indicate a domain, an intent, and/or entity values, and the system(s) 120 may determine that the action performed in response to the user input corresponds to the eligible action type based on the domain, intent and/or entity values determined by the NLU component 260 for the user input.

The system(s) 120 stores (162) second input data in a second data storage for further processing, where the second input data may include at least the device type identifier and the action identifier associated with the user input that was determined to correspond to the eligible action type for the device type identifier. In some embodiments, the second input data may include the eligible action type instead of or in addition to the action identifier. For example, the system(s) 120 may determine that a first user input received by a smart refrigerator manufactured by GE corresponds to the eligible action type of adding an item to a shopping cart, and may store second input data including the device type identifier for the GE smart refrigerator and the appropriate action identifier. The system(s) 120 may determine that a second user input received by the smart refrigerator manufactured by GE does not correspond to the eligible action type of adding an item to a shopping cart, and does not store data relating to the second user input in the second data storage.

In some embodiments, the second input data may include a representation of the user input, a profile identifier corresponding to the user input, one or more skill system(s) 125 invoked to perform the action, and other data relating to the user input. In some embodiments, the second data storage may not include any data identifying the particular user or the particular user input. For example, the second data storage, in some embodiments, may include a hash value corresponding to the profile identifier or other type of masked value/identifier corresponding to profile identifier, so that the user cannot be directly identified by the data stored in the second data storage but the system(s) 120 can still determine whether the user input/action is performed with respect to a unique user.

The second input data may be stored in the second data storage for further processing (which may be performed at a later time). The system(s) 120 determines (164) outcome data corresponding to the second input data. The system(s) 120 may determine the outcome data based on the device type identifier and the eligible action type. The outcome data may indicate what result/outcome/action is to be performed in response to the determining that the user input corresponds to an eligible action for a device type identifier. There may be different outcome data corresponding to different device type identifiers for different eligible action types. For example, a first device type identifier for a Samsung smartphone and a first eligible action type of adding an item to a shopping cart may correspond to first outcome data (e.g., provide a particular amount of payment to Samsung, include data corresponding to the user input in a report, etc.), and a second device type identifier for an iPhone and the first eligible action type of adding an item to a shopping cart may correspond to second outcome data (e.g., provide another particular amount of payment to Apple).

In some embodiments, the system(s) 120 may perform step 158 after multiple user inputs have been processed and data relating to multiple user inputs is stored in the first data storage. For example, the system(s) 120 may perform steps 150, 152, 154, and 156 for multiple other user inputs, at least a second user input, received via the device 110 at the system(s) 120, prior to performing steps 158, 160, 162 and 164, during which the system(s) 120 may evaluate data corresponding to all user inputs that is stored in the first data storage.

In some embodiments, the system(s) 120 may perform step 158 after the system(s) 120 has determined the action (e.g., determining the domain, intent and entity values using the NLU component) to be performed in response to the user input. In some cases, the system(s) 120 may send data related to the user input to one or more skill system(s) 125 to perform the action. In some embodiments, the system(s) 120 may perform the step 158 after the data is sent to the skill system(s) 125 to perform the action. In some embodiments, the system(s) 120 may perform the step 158 at substantially the same time as when the data is sent to the skill system(s) 125.

As such, in some embodiments the system(s) 120 may evaluate the user inputs to determine if they correspond to the eligible action type in almost real-time, as in when the user input is being responded to by the system(s) 120. In other embodiments, the system(s) 120 may delay processing and wait to evaluate the user inputs for eligible action types until multiple user inputs have been received and processed for a period of time (e.g., 48 hours, 24 hours, 12 hours, a week, etc.). The system(s) 120 may employ real-time evaluation for eligible actions when the user input corresponds to particular domains (e.g., music domain). The system(s) 120 may employ delayed evaluation for eligible actions when the user input corresponds to other domains (e.g., shopping domain).

In some embodiments, the system(s) 120 may determine that an action corresponding to a user input may be an eligible action if it was only performed with respect to the particular user (device, application, skill or other object (physical and/or virtual) with its own system identifier) once (or another pre-defined number of times). For example, an action of starting a new music application subscription may only be an eligible action if a user was a first-time registrant or starting a new account with the music application. In such cases, the system(s) 120 may use the profile identifier associated with the user input to determine (at step 160) whether the action corresponds to the eligible action type. For example, the system(s) 120 may determine a first user input corresponds to a first action identifier, a first device type identifier, and a first profile identifier; a second user input corresponds to the first action identifier, the first device type identifier, and the first profile identifier, and may determine that the second user input is not an eligible action because the action corresponding to the first action identifier was already performed with respect to the first profile identifier during the first user input. In another example, the system(s) 120 may determine a third user input corresponds to the first action identifier, a second device type identifier, and the first profile identifier, and the system(s) 120 may determine that the third user input corresponds to an eligible action because it was performed via a different device associated with the second device type identifier.

In another example, two different users may use the same device 110 (e.g., a device installed in a car that the two users share), and may provide user inputs via the same device 110. The system(s) 120 may determine that the same actions performed via the same device but with respect to two different users—both are eligible actions for further processing (for example, the car manufacturer may receive payment for both actions, both actions may be included in a report, etc.). In this case, the system(s) 120 may determine a first user input corresponds to a first action identifier, a first device type identifier, and a first profile identifier; and a second user input corresponds to the first action identifier, the first device type identifier, and a second profile identifier, and determine both the first and second user inputs to correspond to eligible actions.

In some embodiments, the eligible action type may indicate that the action is eligible for further processing if performed only once (or another pre-defined number of times) with respect to/for the user.

In some embodiments, an action may have to be performed using two devices for it to be an eligible action. The system(s) 120 may determine eligibility of an action for further processing based on a device pair and the particular action performed. For example, a user may use a first device (e.g., a smartphone, a smart watch, etc.) to communicate with or pair with a second device, which may be a smart (physical) shopping cart in a store. The user may place items in the smart cart and then provide payment for the items via the first device. In this case, one or more actions performed using the pair of devices—the first device corresponding to a first device type identifier and the second device corresponding to a second device type (or a second device type identifier)—may correspond to eligible actions. Same actions performed using different pair of devices may correspond to different eligible action types and different outcome data. For example, an action of purchasing items using a Samsung phone and a smart cart in a Whole Foods store may correspond to an eligible action type based on the particular action, the first device (Samsung phone) and the second device (smart cart in Whole Foods). In another example, the action of purchasing items using an iPhone device and the smart cart in the Whole Foods store may not correspond to an eligible action type. In yet another example, the action of purchasing items using a Samsung phone and a smart cart in a Wal-Mart store may not correspond to an eligible action type.

A pair of devices, as used above, may refer to a first device that is identified by the device type identifier and communicates with a secondary/second device to perform the action corresponding to the user input. The user input may be received via the first device or the secondary device. Examples of secondary devices include, but are not limited to, a smart shopping cart, a smart shopping bag, a smart bicycle rental system, a car rental system (e.g., ZipCar), or any of the devices 110 described herein.

In some embodiments, an action may be performed using a device 110 with respect to an object, where the eligibility of the action may depend upon the type of device 110 and the type of object. The system(s) 120 may determine eligibility of an action for further processing based on a device-object pair and the particular action performed. The object may be manufactured/distributed/otherwise provided by a particular entity, and when a user performs certain actions with respect to the object using the device 110, the entity that provided the object may receive data related to the eligible action. The object-providing entity may specify the type of device 110 that corresponds to an eligible action. The object-providing entity may specify the type of action that is an eligible action. The device manufacturer of device 110 may specify the type of object and/or the type of action that corresponds to an eligible action. In a non-limiting example, the device 110 may be a Samsung manufactured phone and the object may be a soup can distributed by Campbell Soup Company, and the eligible action may be when a user uses a Samsung phone to purchase the soup can (by adding the soup can to a virtual/online shopping cart/bag, adding the soup can to a smart cart/bag that is paired with the Samsung phone in a grocery store, or performing other actions to purchase the soup can via the Samsung phone). In this case, the Campbell Soup Company may receive data (as specified by the outcome data; e.g., incentive payment, reporting, updating/training of a component, etc.) related to the eligible action. In some cases, the manufacturer of device 110 may receive data related to the eligible action. In some cases, a grocery store (where the user purchases the soup can) may receive data related to the eligible action.

In some embodiments, the system(s) 120 may store the outcome data in the second data storage for further processing by another system. For example, another system may determine payments to be made to various manufacturers associated with different device type identifiers, may determine how the eligible actions may be included in a report to various manufacturers associated with different device type identifiers, and other actions based on the outcome data.

Figure 2:
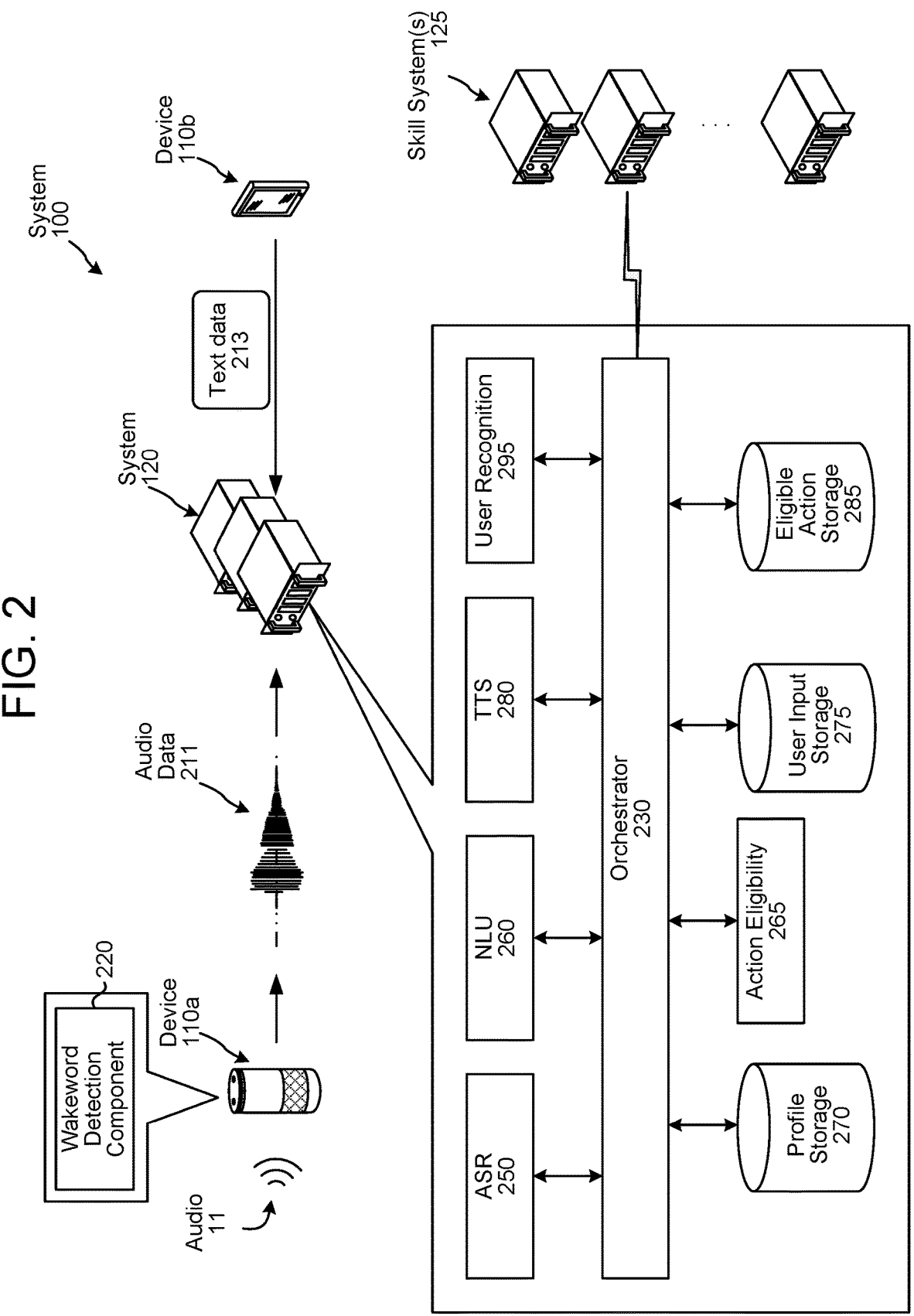
FIG. 2 is a conceptual diagram of components of the system according to embodiments of the present disclosure.

The system 100 may operate using various components as described in FIG. 2. The various components may be located on a same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the system 120. As indicated previously, the device 110a may be configured to detect various wakewords, with each wakeword corresponding to a different assistant. In at least some examples, a wakeword may correspond to a name of an assistant. An example wakeword/assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMIMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a wakeword is detected, the device 110a may "wake" and begin transmitting audio data 211, representing the audio 11, to the system 120. The audio data 211 may include data corresponding to the detected wakeword, or the device 110a may remove the portion of the audio corresponding to the detected wakeword prior to sending the audio data 211 to the system 120.

The system 120 may include an orchestrator component 230 configured to receive the audio data 211 (and optionally and assistant identifier) from the device 110a. The orchestrator component 230 may send the audio data 211 to an ASR component 250.

The ASR component 250 transcribes the audio data 211 into ASR results data (e.g., text data) include one or more ASR hypotheses (e.g., in the form of an N-best list). Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

The device 110b may receive a typed natural language input. The device 110b may generate text data 213 representing the typed natural language input. The device 110b may send the text data 213 to the system 120, wherein the text data 213 is received by the orchestrator component 230.

The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device (110a/110b), the system 120, a skill system 125, etc.) to execute the intent. For example, if the text data corresponds to "play Adele music," the NLU component 260 may determine a <PlayMusic> intent and may identify "Adele" as an artist. For further example, if the text data corresponds to "what is the weather," the NLU component 260 may determine an <OutputWeather> intent. In another example, if the text data corresponds to "turn off the lights," the NLU component 260 may determine a <DeactivateLight> intent. The NLU component 260 may output NLU results data (which may include tagged text data, indicators of intent, etc.).

As described above, the system 120 may perform speech processing using two different components (e.g., the ASR component 250 and the NLU component 260). One skilled in the art will appreciate that the system 120, in at least some examples, may implement a spoken language understanding (SLU) component that is configured to process audio data 211 to generate NLU results data.

In some examples, the SLU component may be equivalent to the ASR component 250 and the NLU component 260. While the SLU component may be equivalent to a combination of the ASR component 250 and the NLU component 260, the SLU component may process audio data 211 and directly generate the NLU results data, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. In some examples, the SLU component outputs a most likely NLU hypothesis, or multiple NLU hypotheses in the form of a lattice or an N-best list with individual NLU hypotheses corresponding to confidence scores or other scores (such as probability scores, etc.).

The system 120 may communicate with one or more skill systems 125. A skill system 125 may be configured to execute with respect to NLU results data. For example, for NLU results data including a <GetWeather> intent, a weather skill system may determine weather information for a geographic location represented in a user profile or corresponding to a location of the device 110 that captured a corresponding natural language input. For further example, for NLU results data including a <BookRide> intent, a taxi skill system may book a requested ride. In another example, for NLU results data including a <BuyPizza> intent, a restaurant skill system may place an order for a pizza. A skill system 125 may operate in conjunction between the system 120 and other devices, such as the device 110, in order to complete certain functions. Inputs to a skill system 125 may come from speech processing interactions or through other interactions or input sources.

A skill system 125 may be associated with a domain. A non-limiting list of illustrative domains includes a smart home domain, a music domain, a video domain, a flash briefing domain, a shopping domain, and/or a custom domain.

The system 120 may include a TTS component 280. The TTS component 280 may generate audio data (e.g., synthesized speech) from text data using one or more different methods. Text data input to the TTS component 280 may come from a skill system 125, the orchestrator component 230, or another component of the system 100.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The system 120 may include a user recognition component 295. In at least some examples, the user recognition component 295 may be implemented as a skill system 125.

The user recognition component 295 may recognize one or more users using various data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, etc.), received by the system 120 in correlation with a natural language input, to stored biometric data of users. The user recognition component 295 may additionally or alternatively perform user recognition by comparing image data (e.g., including a representation of at least a feature of a user), received by the system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill system 125, as well as processing performed by other components of the system 120 and/or other systems.

Figure 3:
FIG. 3 is a schematic diagram of an illustrative architecture in which sensor data is combined to recognize one or more users according to embodiments of the present disclosure.

The system(s) 120 may include a user recognition component 295 that recognizes one or more users using a variety of data. As illustrated in FIG. 3, the user recognition component 295 may include one or more subcomponents including a vision component 308, an audio component 310, a biometric component 312, a radio frequency (RF) component 314, a machine learning (ML) component 316, and a recognition confidence component 318. In some instances, the user recognition component 295 may monitor data and determinations from one or more subcomponents to determine an identity of one or more users associated with data input to the system(s) 120. The user recognition component 295 may output user recognition data 395, which may include a user identifier associated with a user the user recognition component 295 believes originated data input to the system(s) 120. The user recognition data 395 may be used to inform processes performed by various components of the system(s) 120.

The vision component 308 may receive data from one or more sensors capable of providing images (e.g., cameras) or sensors indicating motion (e.g., motion sensors). The vision component 308 can perform facial recognition or image analysis to determine an identity of a user and to associate that identity with a user profile associated with the user. In some instances, when a user is facing a camera, the vision component 308 may perform facial recognition and identify the user with a high degree of confidence. In other instances, the vision component 308 may have a low degree of confidence of an identity of a user, and the user recognition component 295 may utilize determinations from additional components to determine an identity of a user. The vision component 308 can be used in conjunction with other components to determine an identity of a user. For example, the user recognition component 295 may use data from the vision component 308 with data from the audio component 310 to identify what user's face appears to be speaking at the same time audio is captured by a device 110 the user is facing for purposes of identifying a user who spoke an input to the system(s) 120.

The overall system of the present disclosure may include biometric sensors that transmit data to the biometric component 312. For example, the biometric component 312 may receive data corresponding to fingerprints, iris or retina scans, thermal scans, weights of users, a size of a user, pressure (e.g., within floor sensors), etc., and may determine a biometric profile corresponding to a user. The biometric component 312 may distinguish between a user and sound from a television, for example. Thus, the biometric component 312 may incorporate biometric information into a confidence level for determining an identity of a user. Biometric information output by the biometric component 312 can be associated with specific user profile data such that the biometric information uniquely identifies a user profile of a user.

The RF component 314 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 314 the strength of the signal (e.g., as a received signal strength indication (RSSI)). The RF component 314 may use the RSSI to determine an identity of a user (with an associated confidence level). In some instances, the RF component 314 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system(s) 120 for purposes of the system(s) 120 determining who spoke a particular input. Such a registration may occur prior to, during, or after speaking of an input.

The ML component 316 may track the behavior of various users as a factor in determining a confidence level of the identity of the user. By way of example, a user may adhere to a regular schedule such that the user is at a first location during the day (e.g., at work or at school). In this example, the ML component 316 would factor in past behavior and/or trends in determining the identity of the user that provided input to the system(s) 120. Thus, the ML component 316 may use historical data and/or usage patterns over time to increase or decrease a confidence level of an identity of a user.

In at least some instances, the recognition confidence component 318 receives determinations from the various components 308, 310, 312, 314, and 316, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 395.

The audio component 310 may receive data from one or more sensors capable of providing an audio signal (e.g., one or more microphones) to facilitate recognition of a user. The audio component 310 may perform audio recognition on an audio signal to determine an identity of the user and associated user identifier. In some instances, aspects of the system(s) 120 may be configured at a computing device (e.g., a local server). Thus, in some instances, the audio component 310 operating on a computing device may analyze all sound to facilitate recognition of a user. In some instances, the audio component 310 may perform voice recognition to determine an identity of a user.

The audio component 310 may also perform user identification based on audio data 211 input into the system(s) 120 for speech processing. The audio component 310 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 310 may perform user recognition by comparing speech characteristics represented in the audio data 211 to stored speech characteristics of users (e.g., stored voice profiles associated with the device 110 that captured the spoken user input).

The system 120 may include profile storage 270. The profile storage 270 may include a variety of information related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 270 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill systems 125 that the user has enabled. When a user enables a skill system 125, the user is providing the system 120 with permission to allow the skill system 125 to execute with respect to the user's natural language inputs. If a user does not enable a skill system 125, the system 120 may not invoke the skill system 125 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

Figure 4:
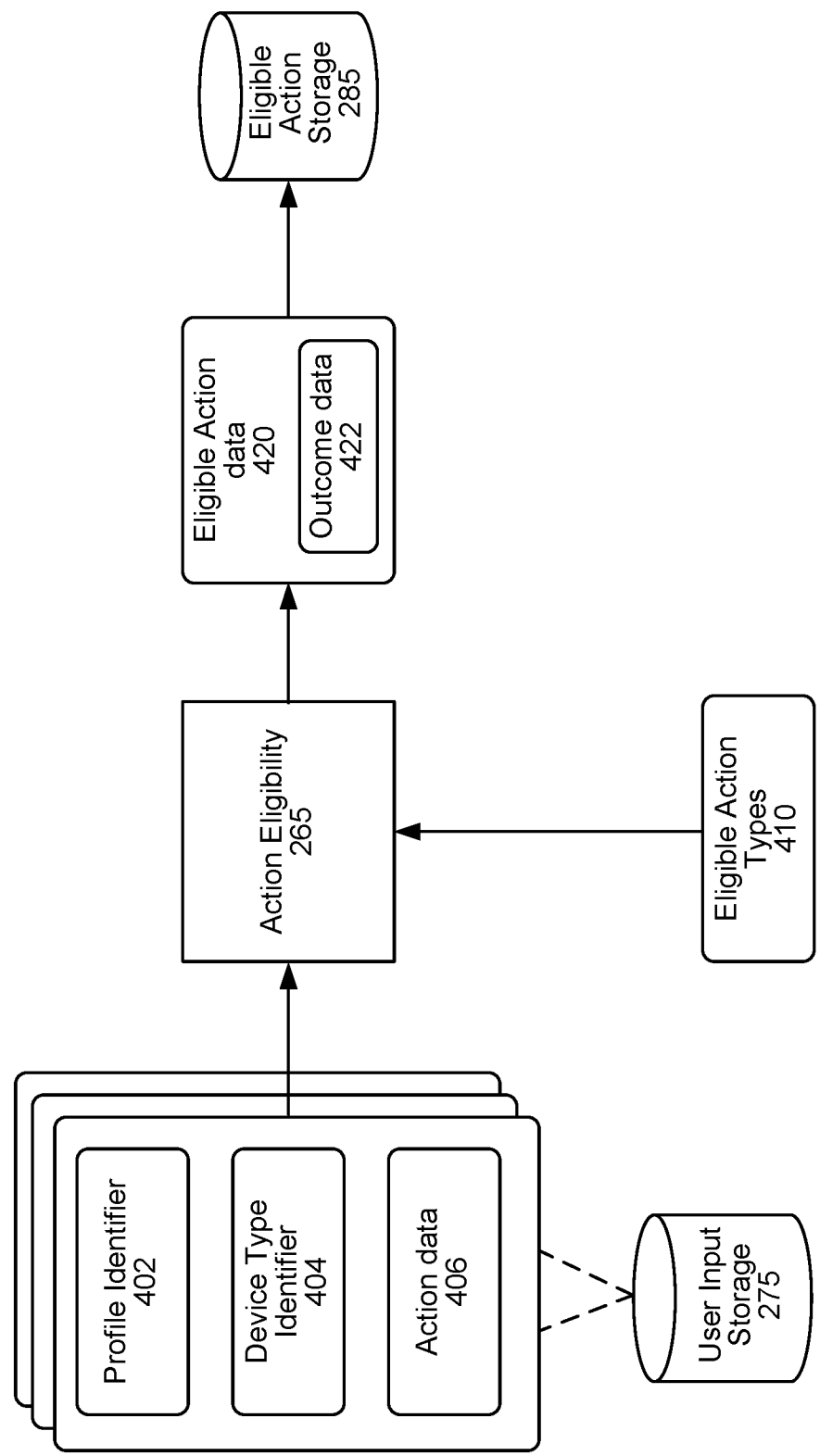
FIG. 4 is a conceptual diagram of processing performed by an action eligibility component according to embodiments of the present disclosure.

FIG. 4 is a conceptual diagram of processing performed by an action eligibility component 265 according to embodiments of the present disclosure. The action eligibility component 265 may receive a profile identifier 402, device type identifier 404 and action data 406. The action eligibility component 265 may also receive eligible action type data 410. The action eligibility component 265 may determine eligible action data 420, along with outcome data 422, which may be stored in the eligible action storage 285 for further processing.

In some embodiments, the action eligibility component 265 may retrieve data from the user input storage 275 for further processing. The action eligibility component 265 may retrieve data relating to a first user input, where the data may be the profile identifier 402, the device type identifier 404 and the action data 406. In some embodiments, another component may retrieve data from the user input storage 275 for further processing, and provide data relating to a first user input, where the data may be the profile identifier 402, the device type identifier 404 and the action data 406. The action eligibility component 265 processes data relating to multiple user inputs stored in the user input storage 275 to determine if any of the user inputs received by the SLU system(s) 120 correspond to an eligible action.

The profile identifier 402 may identify a user profile associated with the user input stored in the user input storage 275. The user profile associated with the user input may be identified as described above in relation to FIGS. 2 and 3. The system(s) 120 may identify the user providing the input and determine the user's profile from the profile storage 270. The profile identifier 402 may identify an individual user. The profile identifier 402 may be an alphanumerical value, a numerical value, or other types of values. The profile identifier 402 corresponds to the action data 406.

The device type identifier 404 may identify a device type associated with the user input stored in the user input storage 275. The device type identifier 404 may identify unique device types, and may be provided by the device manufacturer. The system(s) 120 may determine the device type identifier associated with a user input by using data provided by the device 110 that received/captured the user input. For example, a smart refrigerator manufactured by a first manufacturer may receive a first user input, and may provide data relating to the user input to the system(s) 120 including a first device type identifier associated with the smart refrigerator. In another example, a smart refrigerator manufactured by a second manufacturer may receive a second user input, and may provide data relating to the user input to the system(s) 120 including a second device type identifier associated with the smart refrigerator. The device type identifier 404 may identify different types of devices manufactured by different manufacturers. For example, a first device type identifier may be associated with a particular type of smartphone manufactured by a first manufacturer, a second device type identifier may be associated with another type of smartphone manufactured by the first manufacturer, a third device type identifier may be associated with a tablet manufactured by a second manufacturer, etc. The various devices that may be identified by a device type identifier include, but are not limited to, the devices 110 illustrated in FIG. 9, such as, a smartphone, a tablet, a computer, a speech-enabled device, a smart watch, a smart refrigerator, a car, a washer/dryer, wireless earphones/buds, a microwave, etc.

The action data 406 may include domain, skill, intent data, and entity data to be able to tell the action the user intended to perform. Otherwise the action data may identify the action performed by the system. In some embodiments, the domain, the intent, skill and entity information may be used to determine the particular action to be performed or that was performed. In some embodiments, the action data 406 may include an action identifier generally identifying the action performed. In some embodiments, the action data 406 may be text data describing the action performed.

The eligible action type data 410 may indicate an eligible action associated with a device type identifier, and may also indicate the outcome (e.g., outcome data) of when an eligible action is performed via a device associated with the device type identifier. The eligible action type data 410 may be a data table identifying eligible actions for device type identifiers, and the respective outcome data. The eligible action type data 410 may be determined using data provided by the device manufacturers based on which actions they would like further processing to be performed on. The eligible action type data 410 may also specify device pairs or a device-object pair with respect to which certain performed actions may be eligible actions.

The action eligibility component 265 may determine which user input data (represented by data 402, 404, 406) corresponds to an eligible action data relating to which is to be stored in the eligible action storage 285 for further processing. The action eligibility component 265 may compare the user input data 402, 404, 406 (also referred to herein as the first input data) with the eligible action type data 410 as described above in relation to FIG. 1. The action eligibility component 265 may determine eligible action data 420 (also referred to herein as the second input data) for user inputs that correspond to eligible actions. In some embodiments, the action eligibility component 265 may determine an eligibility indication representing whether the corresponding user input/action corresponds to an eligible action. The eligible action data 420 may at least include a device type identifier and an action identifier. The action eligibility component 265 may also determine corresponding outcome data 422 for an eligible action. The eligible action storage 285 may store data related to multiple eligible actions for further processing according to the corresponding outcome data. Described below are various non-limiting examples of actions that may be eligible for further processing and how they may be processed.

For an example eligible action of a user starting a free or paid subscription of Amazon Music Unlimited using device 110, the action eligibility component 265 may determine that the outcome is to make a payment to the device manufacturer associated with the device type identifier for the device 110 for a particular amount (e.g., $1.00). For an example eligible action of a user starting a free or paid subscription of Audible using device 110, the action eligibility component 265 may determine that the outcome is to make a payment to the device manufacturer associated with the device type identifier for the device 110 for a particular amount (e.g., $2.00). For an example eligible action of a user purchasing an item through Amazon using device 110, the action eligibility component 265 may determine that the outcome is to include data related to this user input in a report to the device manufacturer associated with the device type identifier for the device 110. For an example eligible action of a user adding an item to an Alexa shopping list using device 110, the action eligibility component 265 may determine that the outcome is to include data related to this user input in a report to the device manufacturer associated with the device type identifier for the device 110. For an example eligible action of adding an item to a Whole Foods shopping cart using device 110, the action eligibility component 265 may determine that the outcome is to include data related to this user input in a report to the device manufacturer associated with the device type identifier for the device 110. For an example eligible action of a user reordering an item using device 110, the action eligibility component 265 may determine that the outcome is to make a payment to the device manufacturer associated with the device type identifier for the device 110 for a particular amount (e.g., $0.25). For an example eligible action of a user asking a question for a product using device 110, the action eligibility component 265 may determine that the outcome is to make a payment to the device manufacturer associated with the device type identifier for the device 110 for a particular amount (e.g., $0.25). For an example eligible action of a user providing authentication for an Amazon account using device 110, the action eligibility component 265 may determine that the outcome is to make a payment to the device manufacturer associated with the device type identifier for the device 110 for a particular amount (e.g., $0.25).

The device manufacturers may use the report created by the system(s) 120 that include eligible actions to inform which functionalities their users use more often, and may inform/direct the device manufacturers' efforts in developing, supporting and improving those functionalities.

In some examples, the device type identifiers may be associated with different types of vehicles, based on the vehicle manufacturer, the model, the make, the model year, the trim, location of the vehicle, body type, microphone configuration, other input/output type configurations, infotainment version, other software versions, and other data related to the vehicle.

For an example eligible action, the action eligibility component 265 may determine when a unique user logs into the Alexa Auto application for the first time via a particular vehicle associated with a particular device type identifier, and may determine to make a payment to the vehicle manufacturer. In another example eligible action, after registering his vehicle to be Alexa-enabled for the first time, the user may log out, and the user may register another vehicle to be Alexa-enabled. In some cases, since the actions were performed via two different vehicles but the same user, both actions may be determined to be eligible actions. Alternatively, since the same user registered a different car for Alexa, the system may determine that only one of the inputs corresponds to an eligible action because the user may be using Alexa via a rental vehicle.

In another example eligible action, a user may register his vehicle to be Alexa-enabled for the first time, the user logs out, and another user registers via the same vehicle for Alexa. In this case the action eligibility component 265 may determine that both inputs are eligible actions because the vehicle may be shared by multiple users or the vehicle may have been sold to another user.

An example eligible action may be a user adding an item to a virtual shopping cart using a voice command and purchasing the item within a given time period (e.g., 30 days) via device 110 associated with a particular device type identifier, a user checking-out the items in a virtual shopping cart using a voice command via device 110 associated with a particular device type identifier, a user asking a question about a product causing device 110 associated with a particular device type identifier to lead to a particular product page for the first time, a user reordering an item via device 110 associated with a particular device type identifier, and others.

An example actions may be a user asking a particular type of question relating to a product via device 110 associated with a particular device type identifier. The particular type of question may include a superlative (best, most popular, highest rated, etc.; e.g., "what is the best smoke detector?"), may relate to a product attribute (e.g., "how much does the battery weigh?"), may relate to pricing (e.g., "how much does the 9 volt battery cost?"), may relate to product comparisons (e.g., "which package has the most number of batteries?"), may relate to how to do an activity (e.g., "how do I install the battery?"), and other types of questions. Any of these action may be eligible or ineligible based on system configurations.

Figure 5:
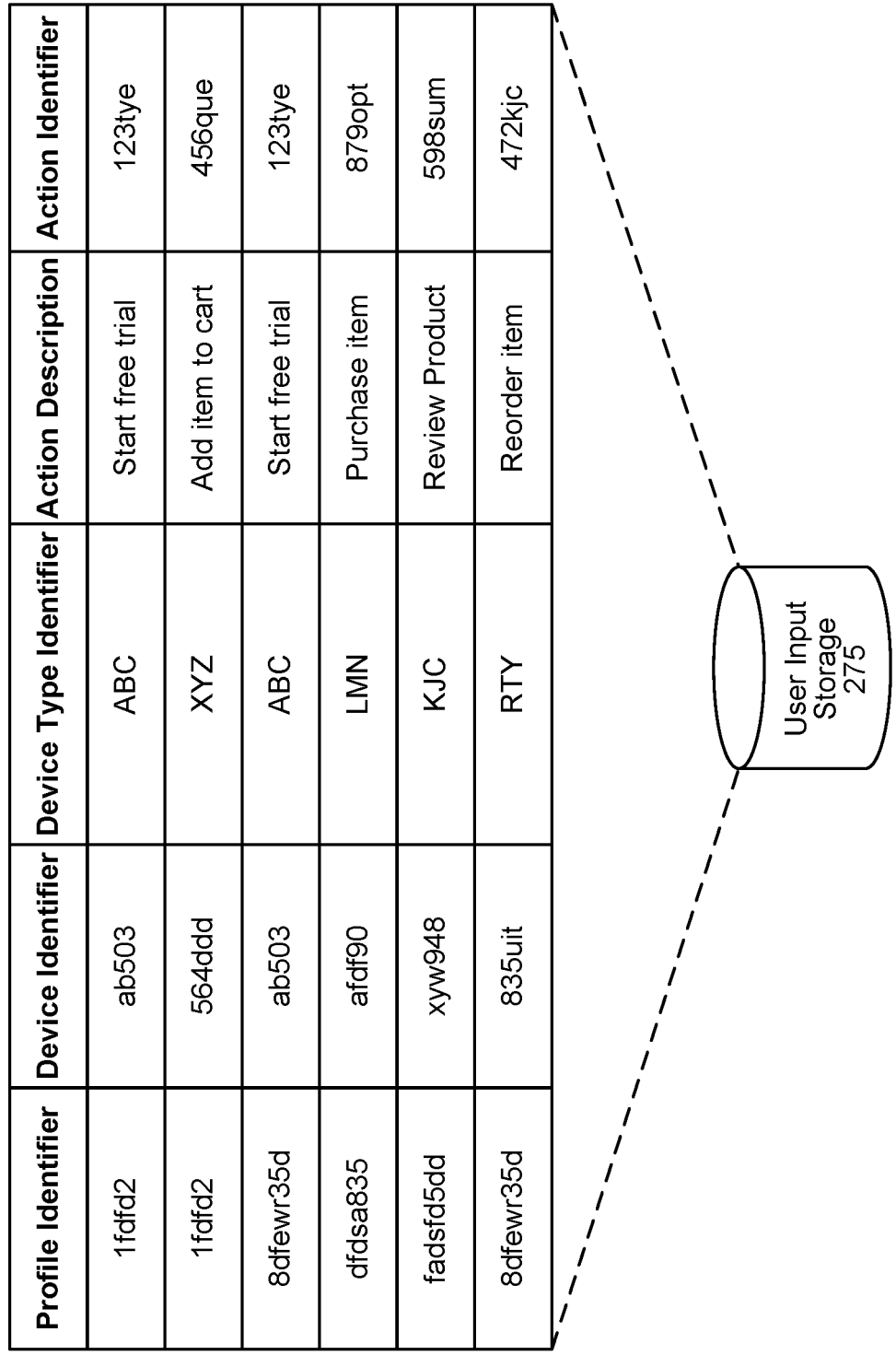
FIG. 5 is a conceptual diagram illustrating data that may be stored in a user input storage according to embodiments of the present disclosure.

FIG. 5 is a conceptual diagram illustrating data that may be stored in a user input storage 275 according to embodiments of the present disclosure. For example, the user input storage 275 may include data representing profile identifiers, device identifiers, device type identifiers, action description, and action identifiers, correspond to multiple user inputs received and processed by the system(s) 120. As shown, more than one user input may correspond to the same profile identifier. As shown, an action associated with the same action identifier and received via a device that corresponds to the same device type identifier may correspond to different profile identifiers. The user input storage 275 may be referred to herein as the first data storage.

Figure 6:
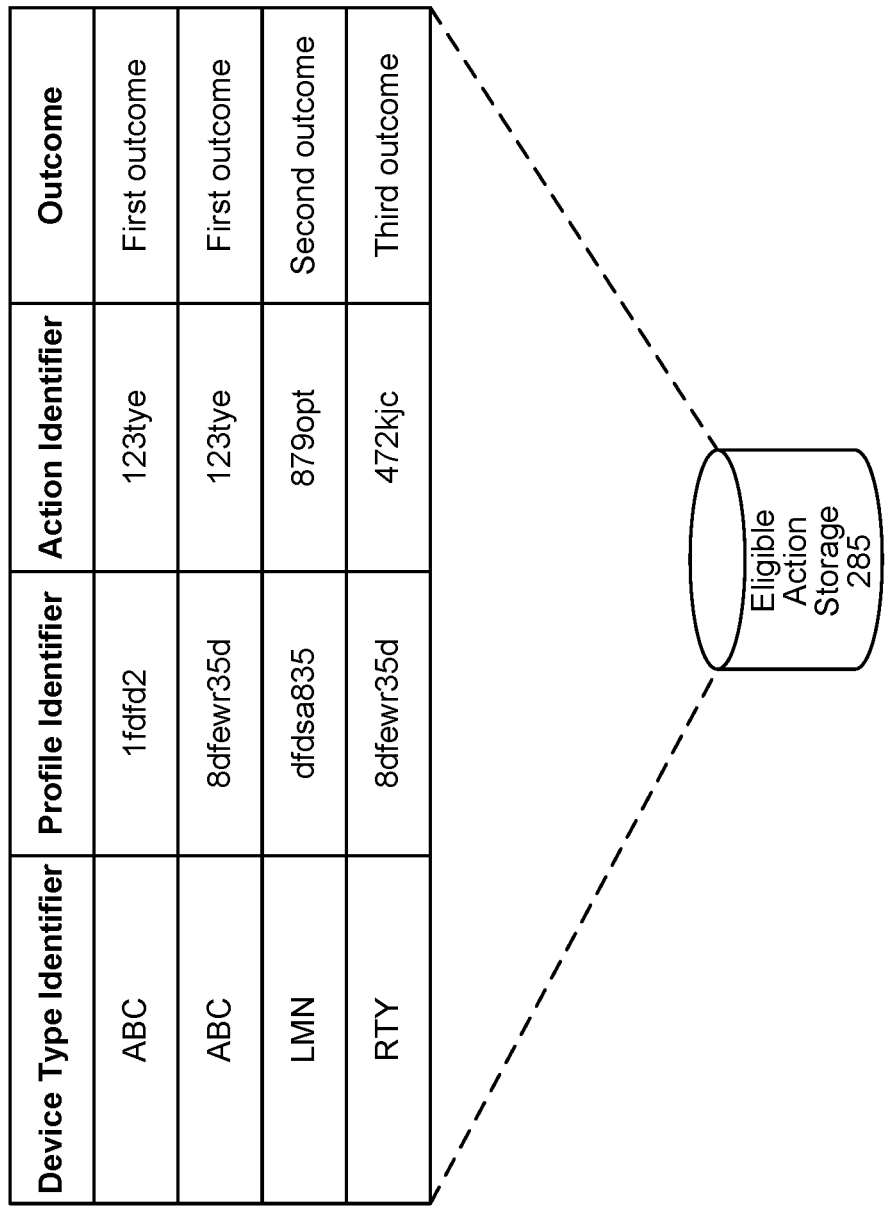
FIG. 6 is a conceptual diagram illustrating data that may be stored in an eligible action storage according to embodiments of the present disclosure.

FIG. 6 is a conceptual diagram illustrating data that may be stored in an eligible action storage 285 according to embodiments of the present disclosure. For example, the eligible action storage 285 may include data representing device type identifiers, profile identifiers, action identifiers, and outcome data, corresponding to multiple eligible actions as determined by the action eligibility component 265. As shown, the eligible action storage 285 may include the same action being performed with respect to a device corresponding to the same device type identifier but the user input correspond to different profile identifiers. Data related to both user input instances is included in the eligible action storage 285. The outcome corresponding to these two user input instances may be the same <first outcome>. The eligible action storage 285 may be referred to herein as the second data storage.

One or more components described herein (e.g., the action eligibility component 265) may run one or more machine learned models that may take as input one or more of the data/information detailed above, and determine whether the user input corresponds to an eligible action type. The model(s) may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 7:
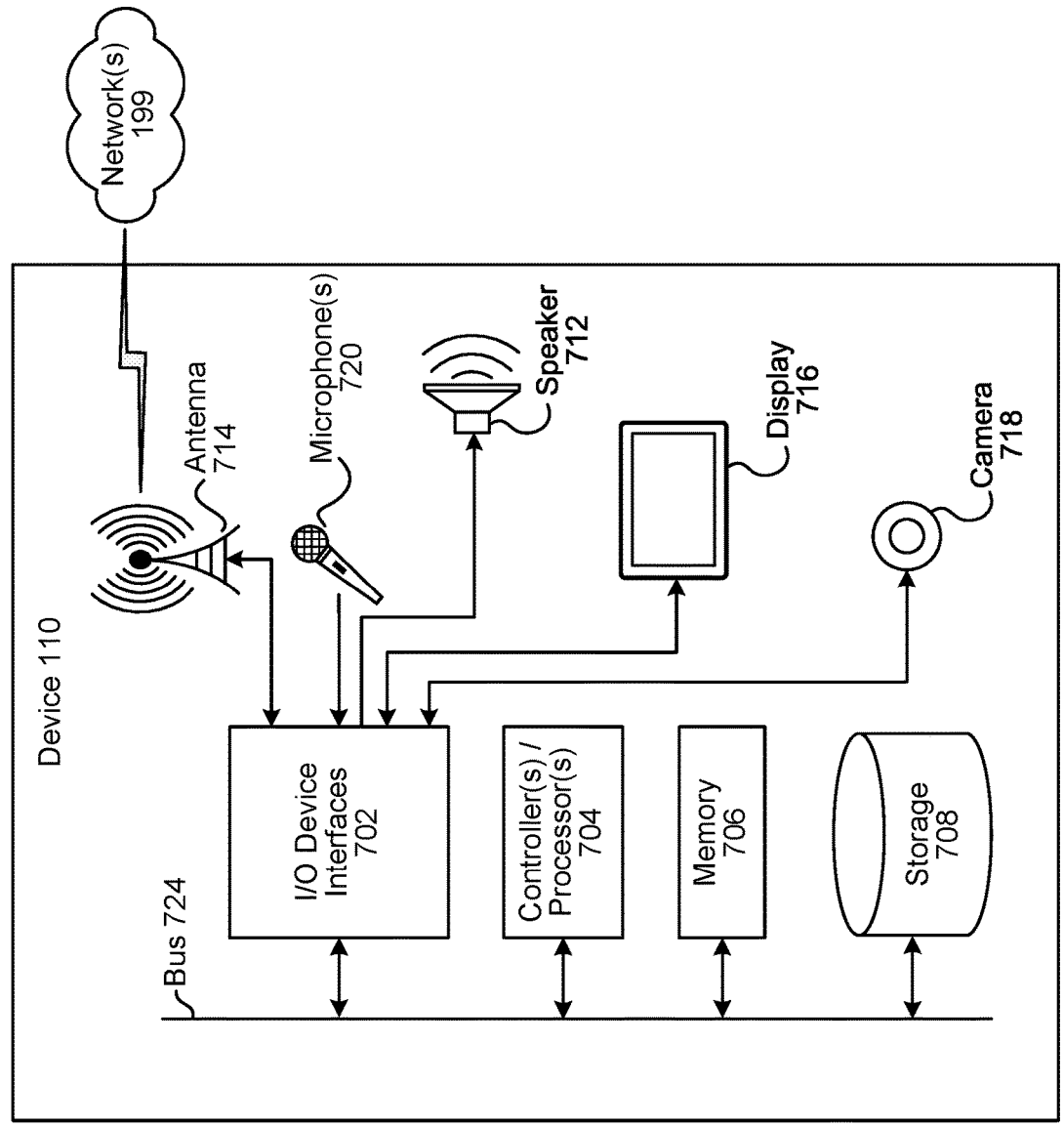
FIG. 7 is a block diagram conceptually illustrating example components of a device.
Figure 8:
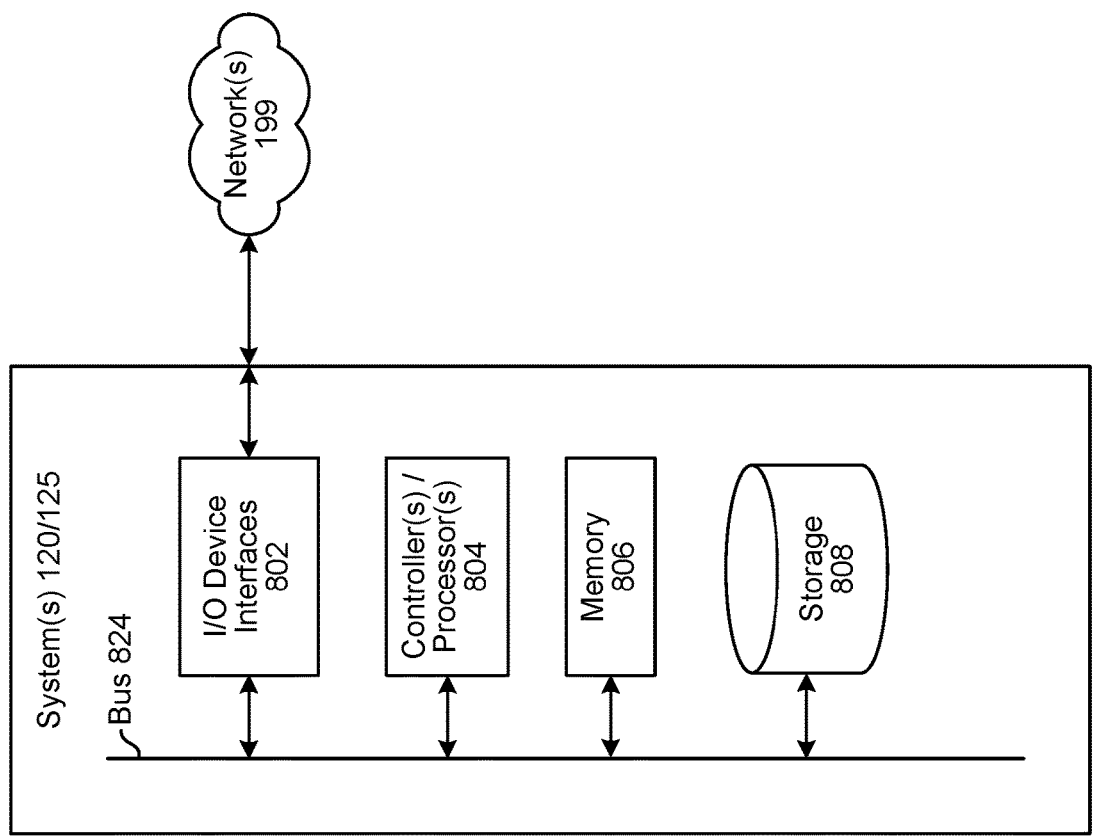
FIG. 8 is a block diagram conceptually illustrating example components of a system.

FIG. 7 is a block diagram conceptually illustrating a device 110 that may be used with the system. FIG. 8 is a block diagram conceptually illustrating example components of a remote device, such as the natural language processing system 120, which may assist with ASR processing, NLU processing, etc.; and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/125) may also include a data storage component (708/808) for storing data and controller/processor-executable instructions. Each data storage component (708/808) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (702/802).

Computer instructions for operating each device (110/120/125) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/125) includes input/output device interfaces (702/802). A variety of components may be connected through the input/output device interfaces (702/802), as will be discussed further below. Additionally, each device (110/120/125) may include an address/data bus (724/824) for conveying data among components of the respective device. Each component within a device (110/120/125) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device 110, the natural language processing system 120, and/or a skill system 125 may include their own dedicated processors, memory, and/or storage. Alternatively, one or more of the components of the device 110, the natural language processing system 120 and/or a skill system 125 may utilize the I/O interfaces (702/802), processor(s) (704/804), memory (706/806), and/or storage (708/808) of the device(s) 110, natural language processing system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language processing system 120, and a skill system 125, as described herein, are illustrative, and may be located as a stand-alone device or may be included, in whole or in part, as a component of a larger device/system.

Figure 9:
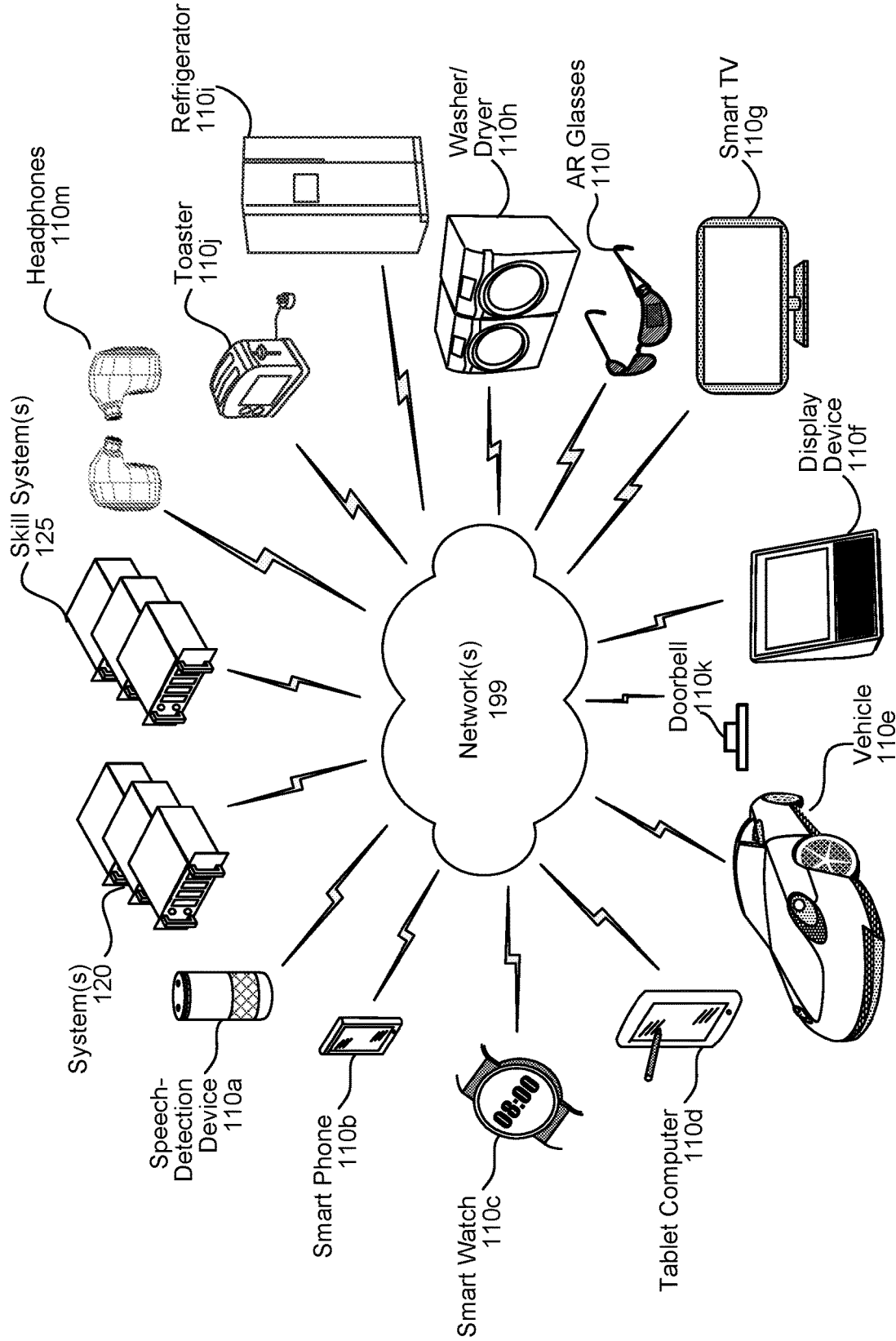
FIG. 9 illustrates an example of a computer network for use with the overall system.

As illustrated in FIG. 9, multiple devices (110a-110m, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a refrigerator 110h, a microwave 110i, a toaster 110j, a doorbell 110k, augmented reality (AR) glasses 110l, and/or headphones 110m may be connected to the network(s) 199 through a wireless service provider, over a WiFi or cellular network connection, or the like. Other devices are included as network-connected support devices, such as the natural language processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
during a first time period:
receiving, from a first device, audio data representing a first utterance;
determining, using the audio data, a first profile identifier;
determining, using the audio data and spoken language understanding, first user input data representing the first utterance;
performing a first action in response to the first utterance;
determining a first device type identifier corresponding to the first device;
storing first data in a first data storage, the first data including the first user input data, the first profile identifier, the first device type identifier, and a first action identifier corresponding to the first action;
determining second user input data representing a second utterance associated with a second profile identifier and received from a second device;
performing a second action in response to the second utterance;
determining a second device type identifier corresponding to the second device; and
storing second data including the second user input data, the second profile identifier, the second device type identifier, and a second action identifier corresponding to the second action;
during a second time period after the first time period:
determining a first eligible action type associated with the first device type identifier, the first eligible action type corresponding to an action that is eligible for reporting;
determining, using the first data, a first eligibility indication based on the first action corresponding to the first eligible action type;
determining a second eligible action type associated with the second device type identifier;
determining, using the second data, a second eligibility indication based on the second action corresponding to an action type different than the second eligible action type; and
storing, based on the first eligibility indication and the second eligibility indication, third data in a second data storage for further processing, the third data including the first user input data, the first profile identifier, the first device type identifier, and the first action identifier.

2. The computer-implemented method of claim 1, further comprising:
during the first time period:
receiving, from the first device, second audio data representing a third utterance;
determining, using the second audio data, a third profile identifier;
determining, using the second audio data and spoken language understanding, third user input data representing the third utterance;
performing a third action in response to the third utterance;
determining that the third action corresponds to the first action identifier; and
storing fourth data in the first data storage, the fourth data including the third user input data, the third profile identifier, the first device type identifier, and the first action identifier;
during the second time period:
determining, using the third data, a third eligibility indication based on:
determining the third action corresponds to the first eligible action type, and
determining that the third profile identifier is different than the first profile identifier; and
storing, based on the third eligibility indication, fifth data in the second data storage for further processing, the fifth data including the third user input data, the third profile identifier, the first device type identifier, and the first action identifier.

3. The computer-implemented method of claim 1, further comprising:
determining that the first action is performed with respect to a third device,
wherein determining the first eligible action type comprises determining the first eligible action type associated with the first device type identifier and a first device type corresponding to the third device, and
wherein storing the third data comprises storing the third data further including an indication of the first device type;
determining third user input data from a fourth device;
performing a third action in response to the third user input data, the third action being performed with respect to the third device, the third action corresponding to the first action identifier;
determining a third device type identifier corresponding to the fourth device;
determining that the first eligible action type is associated with the third device type identifier and the first device type;
determining a third eligibility indication based on the third action corresponding to the first eligible action type;
storing fourth data in the second data storage, the fourth data including the third user input data, a third profile identifier, the third device type identifier, the indication of the first device type, and the first action identifier;
determining first outcome data based on the third data indicating the first device type identifier and the first device type; and
determining second outcome data different from the first outcome data based on the fourth data indicating the third device type identifier and the first device type.

4. A computer-implemented method comprising:
receiving, from a first device, a first user input associated with a first profile identifier, the first user input being an utterance;
determining a device type identifier corresponding to a device type of the first device;

determining a first action identifier, wherein the first action identifier corresponds to a first action performed in response to the first user input;

storing first input data in a first data storage, wherein the first input data includes a representation of the first user input, the first profile identifier, the device type identifier, and the first action identifier;

determining an eligible action type corresponding to an action that is eligible for reporting based on the device type identifier;

determining, using the first input data, that the first action is of the eligible action type;

determining that performing the first action is an initial performance of the first action associated with the first profile identifier; and storing, based on the first action being of the eligible action type and determining the initial performance of the first action associated with the first profile identifier, second input data in a second data storage for further processing, wherein the second input data includes at least the first profile identifier, the device type identifier, and the first action identifier.

5. The computer-implemented method of claim 4, further comprising:

receiving, from a second device, a second user input associated with a second profile identifier;

determining a second device type identifier corresponding to the second device;

determining a second action performed in response to the second user input, the second action corresponding to the first action identifier;

determining that the eligible action type is associated with the second device type identifier;

determining that the second action corresponds to the eligible action type;

storing, based on the second action corresponding to the eligible action type, third input data in the second data storage, wherein the third input data includes at least the second profile identifier, the second device type identifier, and the first action identifier;

determining first outcome data corresponding to the eligible action type and the device type identifier; and determining second outcome data different than the first outcome data, the second outcome data corresponding to the eligible action type and the second device type identifier.

6. The computer-implemented method of claim 4, further comprising:

determining that the eligible action type indicates that eligibility is based on one user input corresponding to one profile identifier;

determining, using second data from the second data storage, a second profile identifier associated with the first action identifier; and determining that the second profile identifier is different than the first profile identifier, and wherein storing, based on the first action corresponding to the eligible action type, the second input data in the second data storage comprises, storing the second input data based on the first profile identifier being different than the second profile identifier.

7. The computer-implemented method of claim 4, further comprising:

determining that the eligible action type corresponds to a first domain;

receiving, from a second device, a second user input associated with a second profile identifier;

determining a second device type identifier corresponding to the second device;

determining a second action performed in response to the second user input; and storing third input data in the first data storage wherein the third input data includes a representation of the second user input, the second profile identifier, the second device type identifier, and a second action identifier corresponding to the second action, wherein the first data storage stores data corresponding to user inputs that are related to the first domain, and wherein determining that the first action corresponds to the eligible action type further comprises determining that the first action corresponds to the eligible action type after storing the third input data in the first data storage.

8. The computer-implemented method of claim 4, further comprising:

determining that the eligible action type corresponds to a first domain;

determining, using a first skill system, output data responsive to the first user input; and determining the first action using the output data, wherein determining that the first action corresponds to the eligible action type further comprises determining that the first action corresponds to the eligible action type after determining the output data and prior to processing a second user input using the first skill system.

9. The computer-implemented method of claim 4, further comprising:

receiving, from the first device, a second user input associated with a second profile identifier;

determining a second action performed in response to the second user input, the second action corresponding to the first action identifier;

storing third input data in the first data storage, wherein the third input data includes a representation of the second user input, the second profile identifier, the device type identifier, and the first action identifier;

determining, using the third input data, that the second action corresponds to the eligible action type;

determining that the second profile identifier is different than the first profile identifier; and storing, based on the second action corresponding to the eligible action type and the second profile identifier being different than the first profile identifier, fourth input data in the second data storage, wherein the fourth input data includes at least the second profile identifier, the device type identifier, and the first action identifier.

10. The computer-implemented method of claim 4, further comprising:

determining that the first action is performed with respect to a second device;

determining a second device type identifier associated with the second device; and determining the eligible action type associated with the device type identifier and the second device type identifier.

11. The computer-implemented method of claim 4, further comprising:

receiving, from the first device, audio data;

processing the audio data using spoken language understanding to determine the first user input;

processing the audio data to determine user recognition data; and determining the first profile identifier using the user recognition data.

12. The computer-implemented method of claim 4, further comprising:
   determining outcome data based on determining correspondence of the first input data with the eligible action type and the device type identifier;
   determining time data representing when the first action is performed;
   wherein storing the second input data in the second data storage further comprises storing the second input data including the outcome data and the time data.

13. A system comprising:
   at least one processor; and
   at least one memory including instructions that, when executed by the at least one processor, cause the system to:
      receive, from a first device, a first user input associated with a first profile identifier, the first user input being an utterance;
      determine a device type identifier corresponding to a device type of the first device;
      determine a first action identifier, wherein the first action identifier corresponds to a first action performed in response to the first user input;
      store first input data in a first data storage that stores first data corresponding to multiple user inputs associated with multiple user profiles, wherein the first input data includes a representation of the first user input, the first profile identifier, the device type identifier, and the first action identifier corresponding to the first action;
      determine an eligible action type corresponding to an action that is eligible for reporting based on the device type identifier;
      determine, using the first input data, that the first action is of the eligible action type;
      determine that performing the first action is an initial performance of the first action associated with the first profile identifier; and
      store, based on the first action being of the eligible action type and determining the initial performance of the first action associated with the first profile identifier, second input data in a second data storage for further processing, wherein the second input data includes at least the first profile identifier, the device type identifier, and the first action identifier.

14. The system of claim 13, wherein the instructions that, when executed by the at least one processor, further cause the system to:
   receive, from a second device, a second user input associated with a second profile identifier;
   determine a second device type identifier corresponding to the second device;
   determine a second action performed in response to the second user input, the second action corresponding to the first action identifier;
   determine that the eligible action type is associated with the second device type identifier;
   determine that the second action corresponds to the eligible action type;
   store, based on the second action corresponding to the eligible action type, third input data in the second data storage, wherein the third input data includes at least the second profile identifier, the second device type identifier, and the first action identifier;
   determine first outcome data based on determining correspondence of the first input data with the eligible action type and the device type identifier; and
   determine second outcome data different than the first outcome data, the second outcome data based on determining correspondence of the third input data with the eligible action type and the second device type identifier.

15. The system of claim 13, wherein the instructions that, when executed by the at least one processor, further causes the system to:
   determine that the eligible action type indicates that eligibility is based on one user input corresponding to one profile identifier;
   determine, using second data from the second data storage, a second profile identifier associated with the first action identifier; and
   determine that the second profile identifier is different than the first profile identifier, and
   wherein the instructions that cause the system to store the second input data in the second data storage further causes the system to store the second input data based on the first profile identifier being different than the second profile identifier.

16. The system of claim 13, wherein the instructions that, when executed by the at least one processor, further causes the system to:
   determine that the eligible action type corresponds to a first domain;
   receive, from a second device, a second user input associated with a second profile identifier;
   determine a second device type identifier corresponding to the second device;
   determine a second action performed in response to the second user input; and
   store third input data in the first data storage wherein the third input data includes a representation of the second user input, the second profile identifier, the second device type identifier, and a second action identifier corresponding to the second action, wherein the first data storage stores data corresponding to user inputs that are related to the first domain, and
   wherein the instructions that cause the system to determine that the first action corresponds to the eligible action type further causes the system to determine that the first action corresponds to the eligible action type after storing the third input data in the first data storage.

17. The system of claim 13, wherein the instructions that, when executed by the at least one processor, further cause the system to:
   determine that the eligible action type corresponds to a first domain;
   determine, using a first skill system, output data responsive to the first user input; and
   determine the first action using the output data,
   wherein the instructions that cause the system to determine that the first action corresponds to the eligible action type further causes the system to determine that the first action corresponds to the eligible action type after determining the output data and prior to processing a second user input using the first skill system.

18. The system of claim 13, wherein the instructions that, when executed by the at least one processor, further cause the system to:
   receive, from the first device, a second user input associated with a second profile identifier;

determine a second action performed in response to the second user input, the second action corresponding to the first action identifier;

store third input data in the first data storage, wherein the third input data includes a representation of the second user input, the second profile identifier, the device type identifier, and the first action identifier;

determine, using the third input data, that the second action corresponds to the eligible action type;

determine that the second profile identifier is different than the first profile identifier; and store, based on the second action corresponding to the eligible action type and the second profile identifier being different than the first profile identifier, fourth input data in the second data storage, wherein the fourth input data includes at least the second profile identifier, the device type identifier, and the first action identifier.

19. The system of claim 13, wherein the instructions that, when executed by the at least one processor, further cause the system to:

determine that the first action is performed with respect to a second device;

determine a second device type identifier associated with the second device; and determine the eligible action type associated with the device type identifier and the second device type identifier.

20. The system of claim 13, wherein the instructions that, when executed by the at least one processor, further cause the system to:

receive, from the first device, audio data;

process the audio data using spoken language understanding to determine the first user input;

process the audio data to determine a user recognition data; and determine the first profile identifier using the user recognition data.

* * * * *